United States Patent
Fotherby et al.

[11] Patent Number: 6,029,841
[45] Date of Patent: Feb. 29, 2000

[54] WASTE CONTAINER ATTACHMENT

[76] Inventors: William A. G. Fotherby, 4033 Highway#2, Newcastle, Ontario; John K. Summerhill, 4033 Highway#2, New Castle, Ontario, both of Canada, L1B 1L9

[21] Appl. No.: 09/057,754

[22] Filed: Apr. 9, 1998

[51] Int. Cl.⁷ .................................................. B65D 6/00
[52] U.S. Cl. ................. 220/23.87; 220/491; 220/668; 224/401; 224/572; 248/311.2; 248/312.1
[58] Field of Search ................. 220/9.1, 9.4, 491, 220/494, 741–743, 737, 668, 475, 485, 23.91, 23.87; 224/401, 409, 412, 434, 572; 248/311.2, 312.1

[56] References Cited

U.S. PATENT DOCUMENTS

| | | | |
|---|---|---|---|
| 1,229,866 | 6/1917 | Bebb | 220/491 |
| 1,577,298 | 3/1926 | Roeller | 224/409 |
| 1,775,335 | 4/1930 | Roman | 294/28 |
| 2,810,502 | 11/1957 | Wackerhagen | 220/741 |
| 2,883,134 | 4/1959 | O'Halloran | 248/210 |
| 2,958,444 | 11/1960 | Rhoe | 220/741 X |
| 3,870,154 | 3/1975 | Monet et al. | 211/74 |
| 4,346,912 | 8/1982 | Habib | 220/491 X |
| 4,688,819 | 8/1987 | Reilly et al. | 172/439 |
| 4,694,972 | 9/1987 | Bimonte et al. | 220/9.4 |
| 4,848,620 | 7/1989 | Chap | 220/491 |
| 5,009,377 | 4/1991 | Mangeruga | 248/99 |

FOREIGN PATENT DOCUMENTS

| | | | |
|---|---|---|---|
| 448507 | 5/1948 | Canada | 220/491 |
| 458148 | 7/1949 | Canada | 224/409 |

*Primary Examiner*—Allan N. Shoap
*Assistant Examiner*—Joe Merek

[57] ABSTRACT

A new waste container attachment for mounting to the handle of a lawnmower. The inventive device includes a frame having a top portion and a bottom portion. The top portion of the frame defines a top opening. The bottom portion of the frame has a pair of spaced apart elongate side rails and a cross rail extending between the side rails. Each of the side rails is coupled to the top portion. A container member has a base and a perimeter side wall extending around the base. The perimeter side wall defines an upper opening into the container member. The container member is insertable through the top opening of the top portion of the frame.

6 Claims, 2 Drawing Sheets

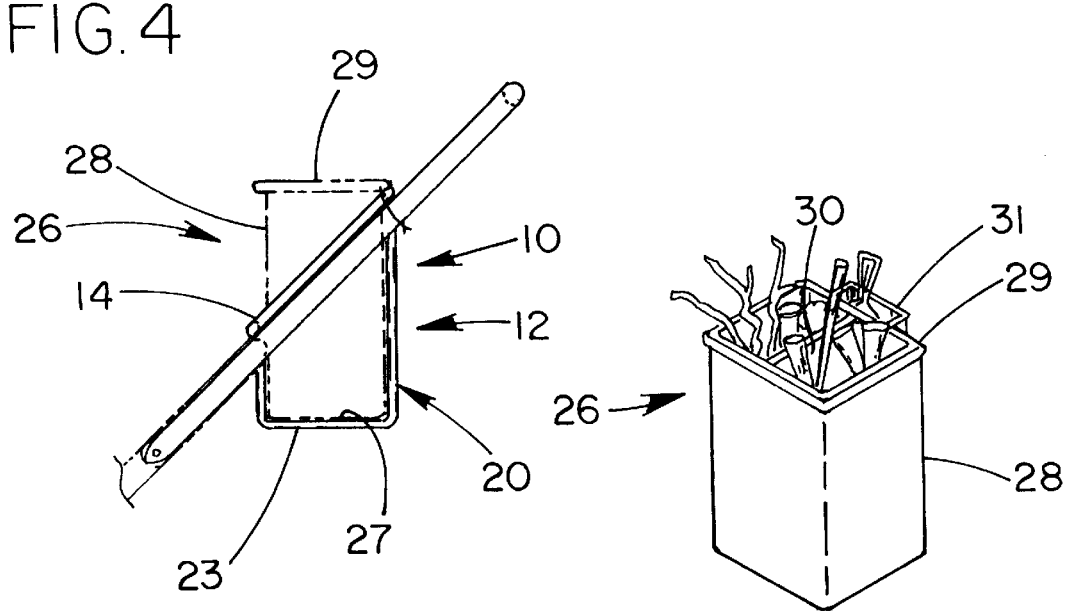
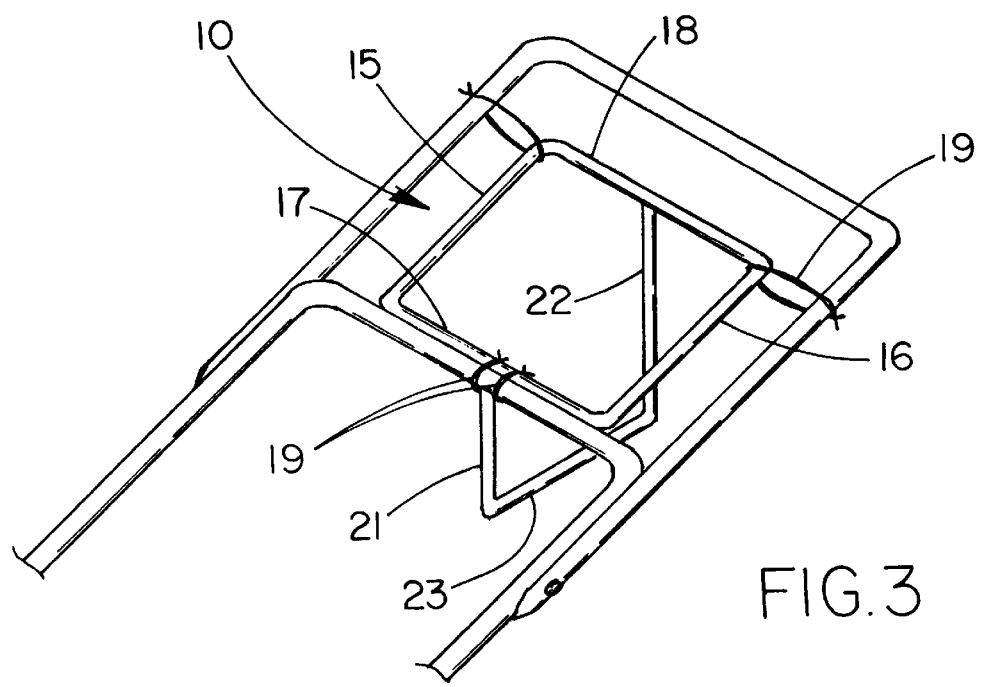

WASTE CONTAINER ATTACHMENT

BACKGROUND OF THE INVENTION

1. Field of the Invention

The present invention relates to container attachments for devices having a push handle such as lawn movers and more particularly pertains to a new waste container attachment for mounting to the handle of a lawnmower.

2. Description of the Prior Art

The use of container attachments for devices having a push handle such as lawn movers is known in the prior art. More specifically, container attachments for devices having a push handle such as lawn movers heretofore devised and utilized are known to consist basically of familiar, expected and obvious structural configurations, notwithstanding the myriad of designs encompassed by the crowded prior art which have been developed for the fulfillment of countless objectives and requirements.

Known prior art container attachments for devices having a push handle such as lawn movers include U. S. Pat. No. 4,892,277; U.S. Pat. No. Des. 306,929; U.S. Pat. No. 4,598,536; U.S. Pat. No. 4,762,297; U.S. Pat. No. 4,050,492; and U.S. Pat. No. 4,672,703.

While these devices fulfill their respective, particular objectives and requirements, the aforementioned patents do not disclose a new waste container attachment. The inventive device includes a frame having a top portion and a bottom portion. The top portion of the frame defines a top opening. The bottom portion of the frame has a pair of spaced apart elongate side rails and a cross rail extending between the side rails. Each of the side rails is coupled to the top portion. A container member has a base and a perimeter side wall extending around the base. The perimeter side wall defines an upper opening into the container member. The container member is insertable through the top opening of the top portion of the frame.

In these respects, the waste container attachment according to the present invention substantially departs from the conventional concepts and designs of the prior art, and in so doing provides an apparatus primarily developed for the purpose of mounting to the handle of a lawnmower.

SUMMARY OF THE INVENTION

In view of the foregoing disadvantages inherent in the known types of container attachments for devices having a push handle such as lawn movers now present in the prior art, the present invention provides a new waste container attachment construction wherein the same can be utilized for mounting to the handle of a lawnmower.

The general purpose of the present invention, which will be described subsequently in greater detail, is to provide a new waste container attachment apparatus and method which has many of the advantages of the container attachments for devices having a push handle such as lawn movers mentioned heretofore and many novel features that result in a new waste container attachment which is not anticipated, rendered obvious, suggested, or even implied by any of the prior art container attachments for devices having a push handle such as lawn movers, either alone or in any combination thereof.

To attain this, the present invention generally comprises a frame having a top portion and a bottom portion. The top portion of the frame defines a top opening. The bottom portion of the frame has a pair of spaced apart elongate side rails and a cross rail extending between the side rails. Each of the side rails is coupled to the top portion. A container member has a base and a perimeter side wall extending around the base. The perimeter side wall defines an upper opening into the container member. The container member is insertable through the top opening of the top portion of the frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new waste container attachment apparatus and method which has many of the advantages of the container attachments for devices having a push handle such as lawn movers mentioned heretofore and many novel features that result in a new waste container attachment which is not anticipated, rendered obvious, suggested, or even implied by any of the prior art container attachments for devices having a push handle such as lawn movers, either alone or in any combination thereof.

It is another object of the present invention to provide a new waste container attachment which may be easily and efficiently manufactured and marketed.

It is a further object of the present invention to provide a new waste container attachment which is of a durable and reliable construction.

An even further object of the present invention is to provide a new waste container attachment which is susceptible of a low cost of manufacture with regard to both materials and labor, and which accordingly is then susceptible of low prices of sale to the consuming public, thereby making such waste container attachment economically available to the buying public.

Still yet another object of the present invention is to provide a new waste container attachment which provides in the apparatuses and methods of the prior art some of the advantages thereof, while simultaneously overcoming some of the disadvantages normally associated therewith.

Still another object of the present invention is to provide a new waste container attachment for mounting to the handle of a lawnmower.

Yet another object of the present invention is to provide a new waste container attachment which includes a frame having a top portion and a bottom portion. The top portion of the frame defines a top opening. The bottom portion of the frame has a pair of spaced apart elongate side rails and a cross rail extending between the side rails. Each of the side rails is coupled to the top portion. A container member has a base and a perimeter side wall extending around the base. The perimeter side wall defines an upper opening into the container member. The container member is insertable through the top opening of the top portion of the frame.

Still yet another object of the present invention is to provide a new waste container attachment that allows a user of a lawn mower type of apparatus to have a container for holding items such as waste, fertilizer, and tools to the handle of the lawn mower.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of an additional positioning of the frame on the handle of a lawn mower.

FIG. 4 is a schematic side view of the present invention.

FIG. 5 is a schematic perspective view of the container member of the present invention.

DESCRIPTION OF THE PREFERRED EMBODIMENT

Figure 2:
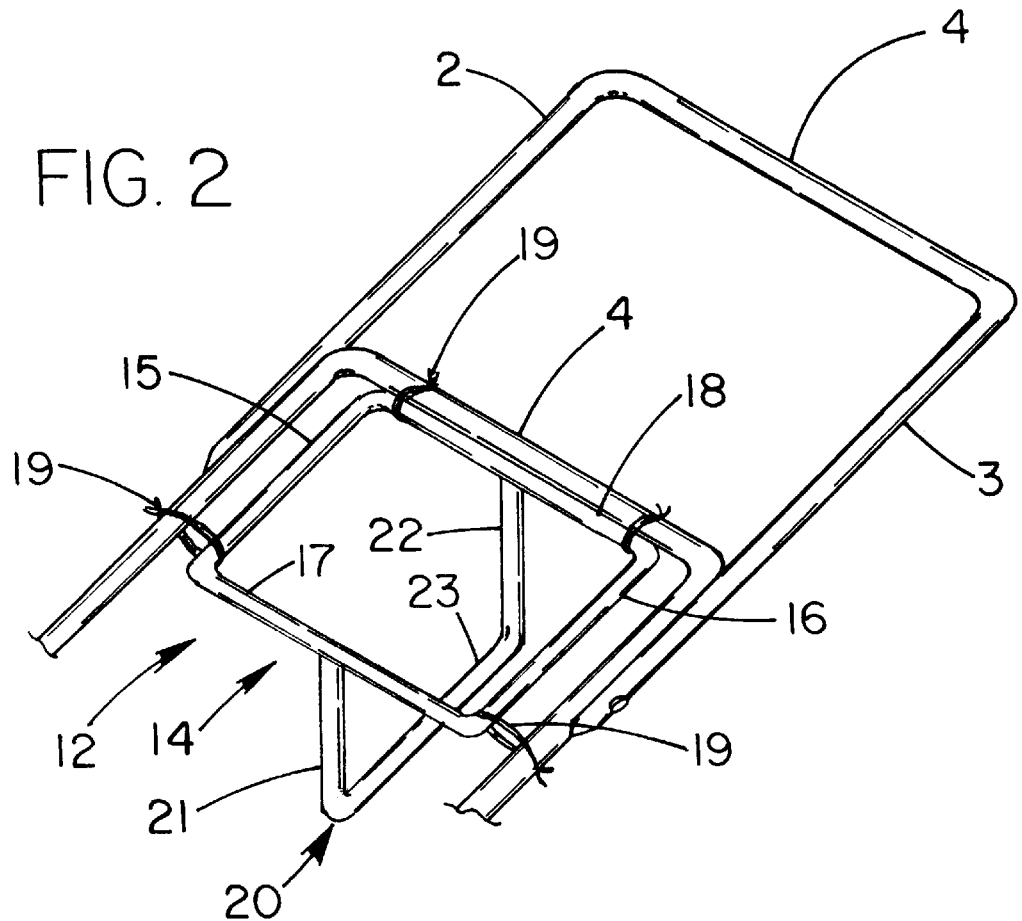
FIG. 2 is a schematic perspective view of the frame of a new waste container attachment attached to the handle of a lawn mower according to the present invention.

With reference now to the drawings, and in particular to FIGS. 1 through 5 thereof, a new waste container attachment embodying the principles and concepts of the present invention and generally designated by the reference numeral 10 will be described.

As best illustrated in FIGS. 1 through 5, the waste container attachment 10 generally comprises a frame 12 having a top portion 14 and a bottom portion 20. The top portion 14 of the frame 12 defines a top opening. The bottom portion 20 of the frame 12 has a pair of spaced apart elongate side rails 21,22 and a cross rail 23 extending between the side rails 21,22. Each of the side rails 21,22 is coupled to the top portion 14. A container member 26 has a base 27 and a perimeter side wall 28 extending around the base 27. The perimeter side wall 28 defines an upper opening into the container member 26. The container member 26 is insertable through the top opening of the top portion 14 of the frame 12.

In use, as illustrated in FIGS. 2 and 3, the container attachment, or holder is designed for attachment to a handle of a lawn mower 1 of the type having a pair of spaced apart elongate arms 2,3 and at least one crossbar 4 extending therebetween.

With reference to FIGS. 2 and 3, the frame 12 has a top portion 14 and a bottom portion 20 and is attachable to the handle of a lawn mower 1. The top portion 14 of the frame 12 is preferably generally rectangular and has a pair of spaced apart elongate end bars 15,16 and a pair of elongate side bars 17,18 which are extended between the end bars 15,16. The end and side bars 15,16,17,18 of the top portion 14 define a top opening. As illustrated in FIGS. 2 and 3, the end bars 15,16 are designed for attaching to the arms 2,3 of a handle of a lawn mower 1 by wire such as twist ties 19 while one of the side bars is attachable to a crossbar 4 of the handle of a lawn mower. Each of the side bars 17,18 has a length and a midpoint along that length.

The bottom portion 20 of the frame 12 has a pair of spaced apart elongate side rails 21,22 and a cross rail 23 extending between the side rails 21,22. Each of the side rails 21,22 has opposite upper and lower ends. Preferably, the upper end of one of the side rails 21 is coupled to one of the side bars 17 of the top portion 14 while the upper end of the other side rail 22 is coupled to the other side bar 18 of the top portion 14. In this preferred embodiment, the cross rail 23 is positioned at the lower ends of the side rails 21,22. Ideally, the upper ends of the side rails 21,22 are coupled to their associated side bars 17,18 at the midpoint of the associated side bar. Each of the side rails 21,22 has a length defined between their upper and lower ends. The lengths of the side rails 21,22 are preferably extended substantially perpendicular to the lengths of their associated side bars. Ideally, as illustrated in FIG. 4, the length of one of the side rails 21 is less than about half the length of the other of the side rails 22.

Figure 1:
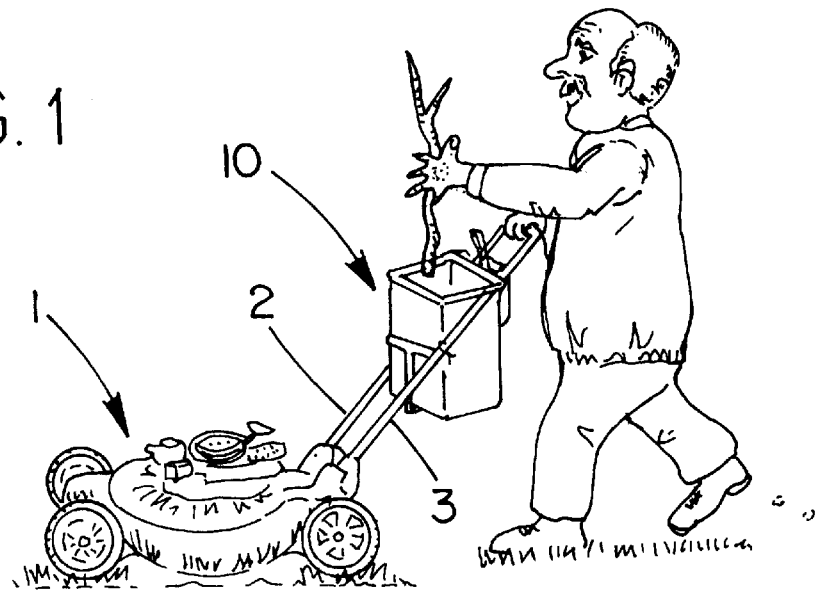
FIG. 1 is a side view of the invention in use on the handle of a lawn mower.

With reference to FIGS. 1, 4, and 5, the container member 26 has a base 27 and a perimeter side wall 28 extending around the base 27. The perimeter side wall 28 defines the upper opening into the container member 26. The perimeter side wall 28 also preferably has an upper lip 29 extending therearound. In the preferred embodiment, the base 27 of the container member 26 is generally rectangular such that the upper opening has a generally rectangular periphery. The container member 26 is removably insertable through the top opening of the top portion 14 of the frame 12 such that the base 27 of the container member 26 rests of the cross rail 23 of the bottom portion 20 of the frame 12 and such that the upper opening of the container member 26 extends upwardly outwards from the top opening of the top portion 14 of the frame 12. Optionally, as illustrated in FIG. 5, a dividing wall 30 may be provided in the interior of the container member 26 to divide the container member 26 into a plurality of compartments. An optional secondary compartment 31 may also be provided on the exterior of the container member 26 for holding items such as tools therein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. In combination, a container and a container holder, the container holder comprising;

a frame having a continuous top portion and a bottom portion, said top portion of said frame being generally rectangular and having a pair of spaced apart elongate end bars and a pair of elongate side bars being extended between said end bars, said end and side bars of said top portion being in a coplanar relationship and defining a top opening;

said bottom portion of said frame having a pair of spaced apart elongate side rails in a parallel relationship and a cross rail being extended between said pair of side rails;

each of said side rails having opposite upper and lower ends, said upper end of one of said side rails being coupled to one of said side bars of said top portion, said upper end of another of said side rails being coupled to another of said side bars of said top portion, each of said side rails having a length;

wherein said length of one of said side rails is less than said length of the other of said side rails;

said container member having a base and a substantially tubular side wall extending around said base with a uniform height, said side wall defining an upper opening into said container member, said side wall having an upper lip extending therearound, said side wall having a continuous upper lip extending therearound; and said container member being insertable through said top opening of said top portion of said frame such that said upper lip is supported on said top portion of said frame by only the side bar connected to a longer one of said side rails.

2. The combination of claim 1, wherein each of said side bars having a length, each of said side bars having a midpoint along said length of said side bar, and wherein said upper ends of said side rails are coupled to their associated side bar at the midpoint of the associated side bar.

3. The combination of claim 1, wherein each of said side rails having a length, wherein said lengths of said side rails are extended substantially perpendicular to the lengths of their associated side bar, said cross rail being positioned at said lower ends of said side rails.

4. The combination of claim 1, wherein said length of said one side rail is less than about half said length of said other side rail.

5. The combination of claim 1 wherein said base of said container member is generally rectangular such that said upper opening has a generally rectangular periphery.

6. The combination of claim 1 additionally comprising a dividing wall in the interior of said container member to divide said container member into a plurality of compartments, a secondary compartment being provided on the exterior of said container member, said secondary compartment being for holding items such as tools therein.

\* \* \* \* \*